(12) United States Patent
Hyung et al.

(10) Patent No.: US 8,315,737 B2
(45) Date of Patent: Nov. 20, 2012

(54) APPARATUS FOR LOCATING MOVING ROBOT AND METHOD FOR THE SAME

(75) Inventors: Seung Yong Hyung, Yongin-si (KR); Kyung Shik Roh, Seongnam-si (KR); Woong Kwon, Seongnam-si (KR); San Lim, Suwon-si (KR); Sukjune Yoon, Seoul (KR); Hyun Kyu Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 506 days.

(21) Appl. No.: 12/379,433

(22) Filed: Feb. 20, 2009

(65) Prior Publication Data

US 2009/0292394 A1 Nov. 26, 2009

(30) Foreign Application Priority Data

May 21, 2008 (KR) .................. 10-2008-0047207

(51) Int. Cl.
*G05B 19/18* (2006.01)
(52) U.S. Cl. ...................................................... 700/251
(58) Field of Classification Search .................. 701/251; 700/251, 253
See application file for complete search history.

(56) References Cited

U.S. PATENT DOCUMENTS

| | | | |
|---|---|---|---|
| 2004/0013295 A1* | 1/2004 | Sabe et al. | 382/153 |
| 2006/0064202 A1* | 3/2006 | Gutmann et al. | 700/245 |
| 2007/0027612 A1* | 2/2007 | Barfoot et al. | 701/117 |
| 2007/0100496 A1* | 5/2007 | Forell | 700/245 |
| 2008/0009970 A1* | 1/2008 | Bruemmer | 700/245 |
| 2008/0100505 A1* | 5/2008 | Malinovskiy et al. | 342/357.06 |
| 2008/0136626 A1* | 6/2008 | Hudson et al. | 340/540 |
| 2009/0226113 A1* | 9/2009 | Matsumoto et al. | 382/284 |
| 2009/0234499 A1* | 9/2009 | Nielsen et al. | 700/250 |
| 2009/0281661 A1* | 11/2009 | Dooley et al. | 700/258 |
| 2009/0292394 A1* | 11/2009 | Hyung et al. | 700/251 |

FOREIGN PATENT DOCUMENTS

KR   10-0168189 B1   10/1998

* cited by examiner

*Primary Examiner* — Mary Cheung
*Assistant Examiner* — Michael D Lang
(74) *Attorney, Agent, or Firm* — Staas & Halsey LLP (57) ABSTRACT

An apparatus and a method of locating a moving robot are disclosed. The apparatus includes a storage unit storing information on straight lines of wall on a map, a state quantity detection unit detecting quantity of state of the robot running along the wall, and a control unit estimating an interior position of the robot by obtaining straight line information based on the detected state quantity and matching the obtained straight line information with the stored straight line information.

23 Claims, 10 Drawing Sheets

APPARATUS FOR LOCATING MOVING ROBOT AND METHOD FOR THE SAME

CROSS-REFERENCE TO RELATED APPLICATIONS

This application claims the benefit of Korean Patent Application No. 2008-0047207, filed May 21, 2008, in the Korean Intellectual Property Office, the disclosure of which is incorporated herein by reference.

BACKGROUND

1. Field

The present general inventive concept relates to an apparatus and a method of locating a moving robot, and more particularly to an apparatus to detect a position of a moving robot using a distance sensor that senses an obstacle.

2. Description of the Related Art

A movable robot such as a robot cleaner must be able to recognize a correct position. Conventional robots have been using an absolute navigation method combined with a dead reckoning (DR) method in recognizing position. The absolute navigation includes a method of attaching a radio frequency identification (RFID) or an absolute positioning mark to a certain fixed position, and a method using a global positioning system (GPS). In case of DR, the position can be detected by obtaining a rotational velocity and a straight advance velocity using an encoder sensor mounted to a wheel of the robot and performing integral calculus with the obtained velocity values. Additionally, DR includes a method that doubly performs integral calculus with an acceleration value obtained from an acceleration sensor, and a method that performs integral calculus with a rotational velocity which is an output of a gyro sensor. Although the DR methods are very precise, since the position value results from integral calculus, an error is increased as a running distance of the robot and the number of rotations are increased.

Often, robots mounted with wheels use an inertial navigation method that uses an encoder sensor and a gyro sensor, because these sensors are advantageous in terms of precision and low cost. However, with the inertial navigation, errors are accumulated and furthermore the error, once generated, cannot be easily compensated. Although an inertial error can be compensated for by a GPS sensor monitoring the robot from the outdoors, the GPS sensor is unavailable indoors or in the center of a city having the possibility of multiple paths. Though there is another sensor which applies trigonometry, this is not desirable because a dedicated attachment is required. Also, a simultaneous localization and map building (SLAM) method has been widely used, which simultaneously performs position detection of the robot and drawing of a map. However, the SLAM method is disadvantageous because an expensive camera and scan sensor are required.

SUMMARY

Accordingly, it is an aspect of the present general inventive concept to provide an apparatus to locate a moving robot, capable of locating the moving robot more precisely by compensating for an error resulting from inertial navigation by using interior map information and a low-cost distance sensor used to avoid an obstacle, and a method for the same.

It is another aspect of the present general inventive concept to compensate for, an error of the inertial navigation using an inexpensive distance sensor for avoiding an obstacle and interior map information without requiring complicated algorithms and expensive equipment such as a scan sensor, a camera and a GPS. Moreover, the position of the robot in the interior place can be detected more precisely.

Additional aspects and utilities of the present general inventive concept will be set forth in part in the description which follows and, in part, will be apparent from the description, or may be learned by practice of the general inventive concept.

The foregoing and/or other aspects and utilities of the present general inventive concept may be achieved by providing a method of locating a robot including obtaining information on absolute coordinates of a space where the robot will move, obtaining information on relative coordinates of the space including running the robot in the space, obtaining coordinate transformation information including comparing the information on absolute coordinates with the information relative coordinates, and perceiving the robot position including transforming a position of the information relative coordinates to a position of the information absolute coordinates using the coordinate transformation information.

The foregoing and/or other aspects and utilities of the present general inventive concept may be achieved by providing a method of locating a robot including operating the robot to run following a wall, obtaining straight line information on straight lines defining the wall during the operation the robot to fun following the wall, matching the obtained straight line information with straight line information of a presorted map, and estimating an interior position of the robot based on the matching result.

The foregoing and/or other aspects and utilities of the present general inventive concept may be achieved by providing a method of locating a robot includes operating the robot to run following a wall, detecting a state quantity of the robot during the operating the robot to follow the wall, obtaining straight line information on straight lines defining the wall based on the detected state quantity, extracting feature points from the obtained straight line information, matching the extracted feature points with feature points on a presorted map, and estimating an interior position of the robot based on the matching.

The foregoing and/or other aspects and utilities of the present general inventive concept may be achieved by providing an apparatus to locate a robot including a storage unit storing straight line information on straight lines defining a wall on a map, a state quantity detection unit detecting state quantities of the robot running along the wall, and a control unit estimating an interior position of the robot by obtaining straight line information based on the detected state quantity and matching the obtained straight line information with the stored straight line information.

The foregoing and/or other aspects and utilities of the present general inventive concept may be achieved by providing an apparatus to locate a robot including a state quantity detection unit detecting a state quantity of the robot running along a wall, and a control unit estimating an interior position of the robot by obtaining straight line information by inputting the detected state quantity to a Kalman filter and matching feature points extracted from the obtained straight line information with features points on a prestored map by ICP correspondence.

BRIEF DESCRIPTION OF THE DRAWINGS

These and/or other aspects and advantages of the present general inventive concept will become apparent and more readily appreciated from the following description of the embodiments, taken in conjunction with the accompanying drawings, of which.

DETAILED DESCRIPTION OF EMBODIMENTS

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Figure 1:
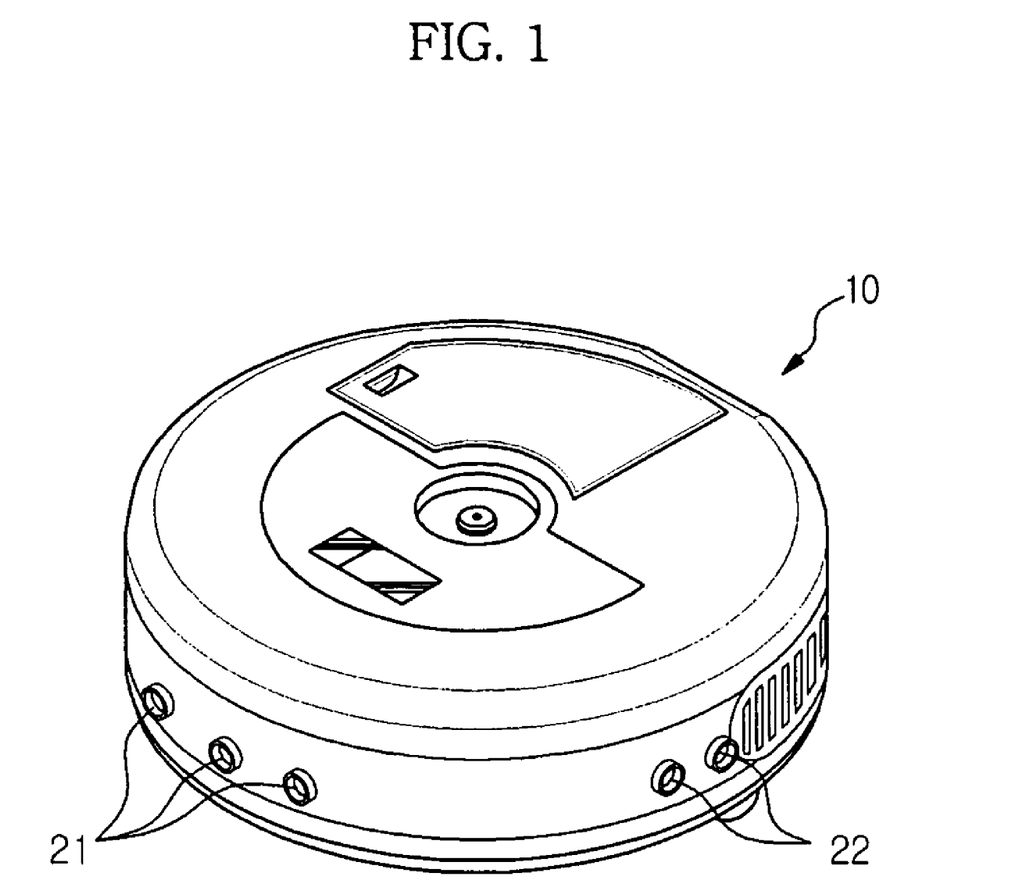
FIG. 1 is a perspective view illustrating a structure of a robot according to an embodiment of the present general inventive concept.
Figure 2:
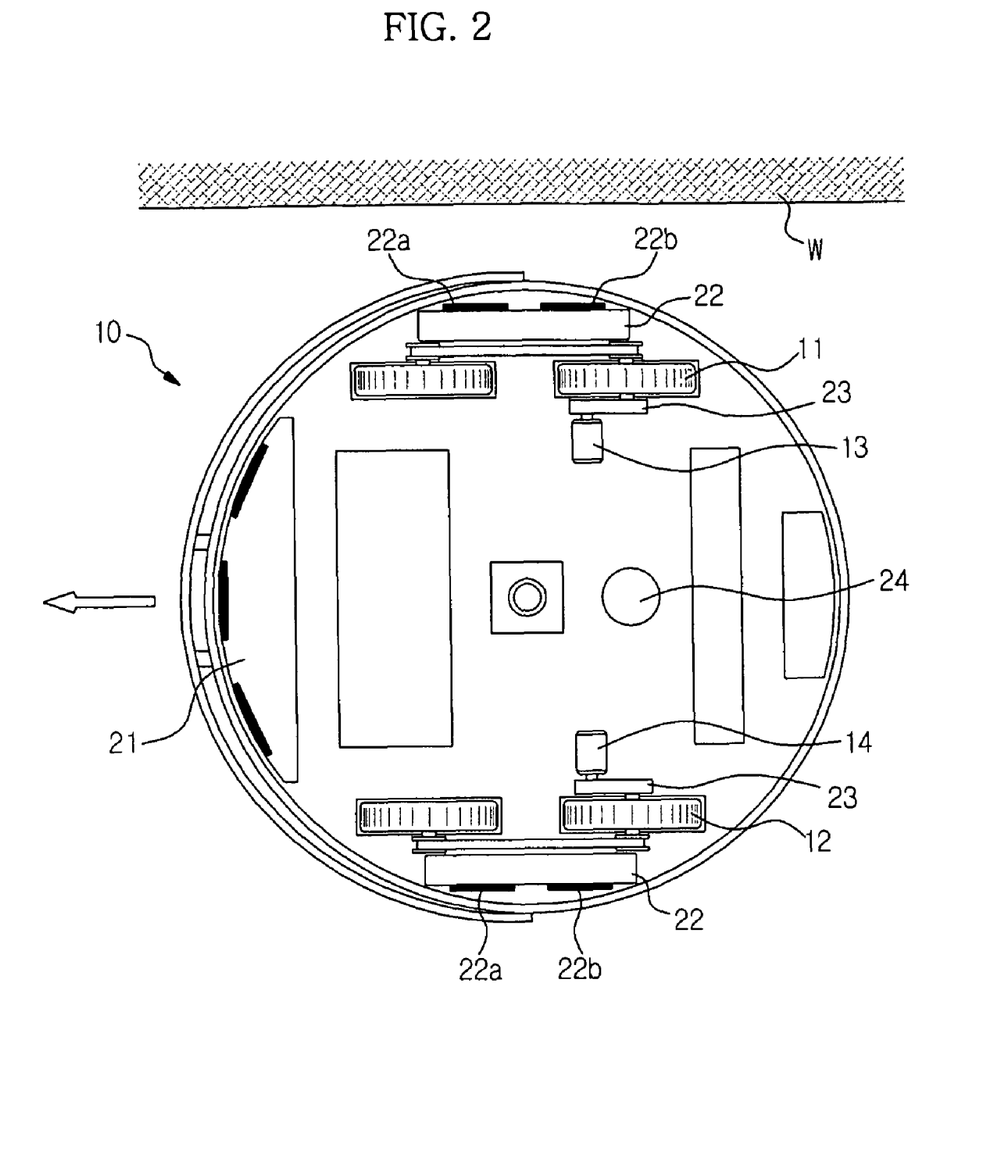
FIG. 2 is a view illustrating an inside structure of the robot of FIG. 1.
Figure 3:
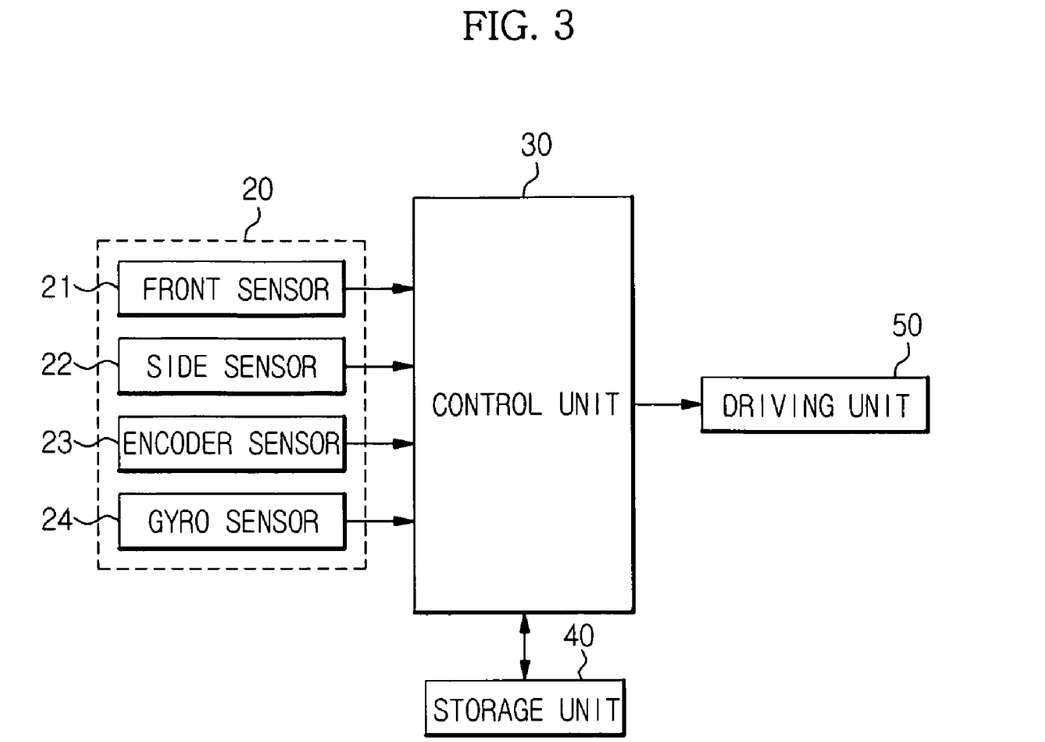
FIG. 3 is a control block diagram illustrating a robot according to the embodiment of the present general inventive concept.

FIG. 1 is a view illustrating a structure of a robot according to an embodiment of the present general inventive concept. FIG. 2 is a view illustrating an inside structure of the robot of FIG. 1. FIG. 3 is a control block diagram illustrating the present robot.

Referring to FIG. 1 through FIG. 3, the present robot includes a state quantity detection unit 20, a control unit 30, a storage unit 40 and a driving unit 50.

The state quantity detection unit 20 includes a front sensor 21 and a side sensor 22 disposed around a main body 10. For the front sensor 21 and the side sensor 22, an optical sensor that transmits signals to the outside and receives reflected signals or an ultrasonic sensor that emits ultrasonic waves and receives reflected ultrasonic waves can be employed. The front sensor 21 and the side sensor 22 are provided to detect obstacles and walls, and thereby measure a distance to the wall therefrom. In particular, the side sensor 22 is mounted at one side of the main body 10 to be parallel with first and second wheels 11 and 12 of the driving unit 50. The side sensor 22 includes first and second side sensors 22a and 22b spaced by a predetermined interval from each other. That is, the first and second side sensors 22a and 22b are disposed on both side surfaces of the main body 10 parallel with a running direction of the robot. Any type of sensor can be used for the side sensor 22 as long as the sensor is able to measure a distance to the wall. Therefore, the first side sensor 22a and the second side sensor 22b of the side sensor 22 may each include an infrared LED that emits infrared rays and a light receiving diode that receives reflected light, being vertically arranged in a pair. Alternatively, the side sensor 22 may include an ultrasonic sensor that emits ultrasonic waves and receives reflected ultrasonic waves. Therefore, when the robot is not in a level position while running along the wall, detected values of the side sensor 22 are varied. The side sensor 22 may be mounted at one side of the main body 10, but may also be mounted at both sides of the main body 10 so that the robot is able to run along the wall bidirectionally.

The state quantity detection unit 20 include an encoder sensor 23 and a gyro sensor 24 which are mounted in the main body 10. The encoder sensor 23 detects rpm of the first and the second wheels 11 and 12 which move the main body 10. The gyro sensor 24 detects an angle of rotation of the main body 10.

The storage unit 40 stores information on an interior map which will be explained hereinafter.

The driving unit 50 includes the first wheel 11 mounted on the right of the main body 10 with respect to the running direction, the second wheel 12 mounted on the left of the main body 10, and first and second motors 13 and 14 rotating the first and the second wheels 11 and 12, respectively. The control unit 50 operates the first motor 13 and the second motor 14 to independently rotate forward or backward according to controlling signals of the control unit 30. The running direction of the robot is determined by setting the rpm of the first and the second motors 13 and 14 to be different from each other.

The control unit 30 receives signals from the state quantity detection unit 20, thereby controlling the driving unit 50 to operate the robot to be parallel with the wall.

The robot according to the embodiment of the present general inventive concept may further include a dust suction unit. In this case, the dust suction unit may include a suction motor mounted to the main body 10 to draw in dust from a facing floor or surface along with air, and a dust collection chamber collecting the dust drawn in by the operation of the suction motor through a suction inlet or a suction pipe formed to face the floor.

Hereinafter, the operation of the above structured robot running along the wall will be explained.

Upon input of a wall following command, the control unit 30 moves to a wall determined to be closest through the front sensor 21 and the side sensor 22. Here, the wall following command refers to a command given to the robot to run along the wall maintaining a constant distance to the wall.

The robot, moved to the nearest wall, runs in parallel with respect to the wall as being spaced apart from the wall by a predetermined distance. Here, the control unit 30 controls the driving unit 50 to run the robot in the parallel with the wall using the state quantity detection unit 20. For example, when the wall and the robot are parallel, the control unit 30 controls the driving unit 50 to rotate the first motor 13 and the second motor 14 by the same rpm. However, as the robot recedes from the wall, the control unit 30 controls the driving unit 50 to operate the robot to approach the wall. On the contrary, when the robot approaches the wall, the driving unit 50 is controlled to operate the robot to recede from the wall.

The control unit 30 stores, to the storage unit 40, movement locus of the robot that has been running at the constant distance to the wall. The control unit 30 determines whether the movement locus of the robot meets a starting point of the movement locus and if so, finishes the wall following operation of the robot. That is, the control unit 30 checks whether the movement locus of the robot performing the wall following running forms a looped curve and, when the movement locus forms the looped curve, finishes the wall following operation.

In addition, when controlling the wall following running of the robot, the control unit 30 obtains information on straight lines of the wall along which the robot runs, by inputting a quantity of state varied according to movement of the robot detected by the state quantity detection unit 20 to a Kalman filter. Then, the control unit 30 estimates a position of the robot in an interior place by matching the straight line information regarding the interior wall and straight line information on a prestored map of the interior place. More specifically, the control unit 30 obtains the information on the straight line of the wall the robot is following, by setting the state quantity detected during the wall following operation as an input to the Kalman filter, extracts a feature point from the straight line information of the interior wall, matches the extracted feature point with a feature point of the prestored interior map using an Iterated closest point (ICP) method, and thereby estimates the interior position of the robot according to the result of matching.

Figure 4:
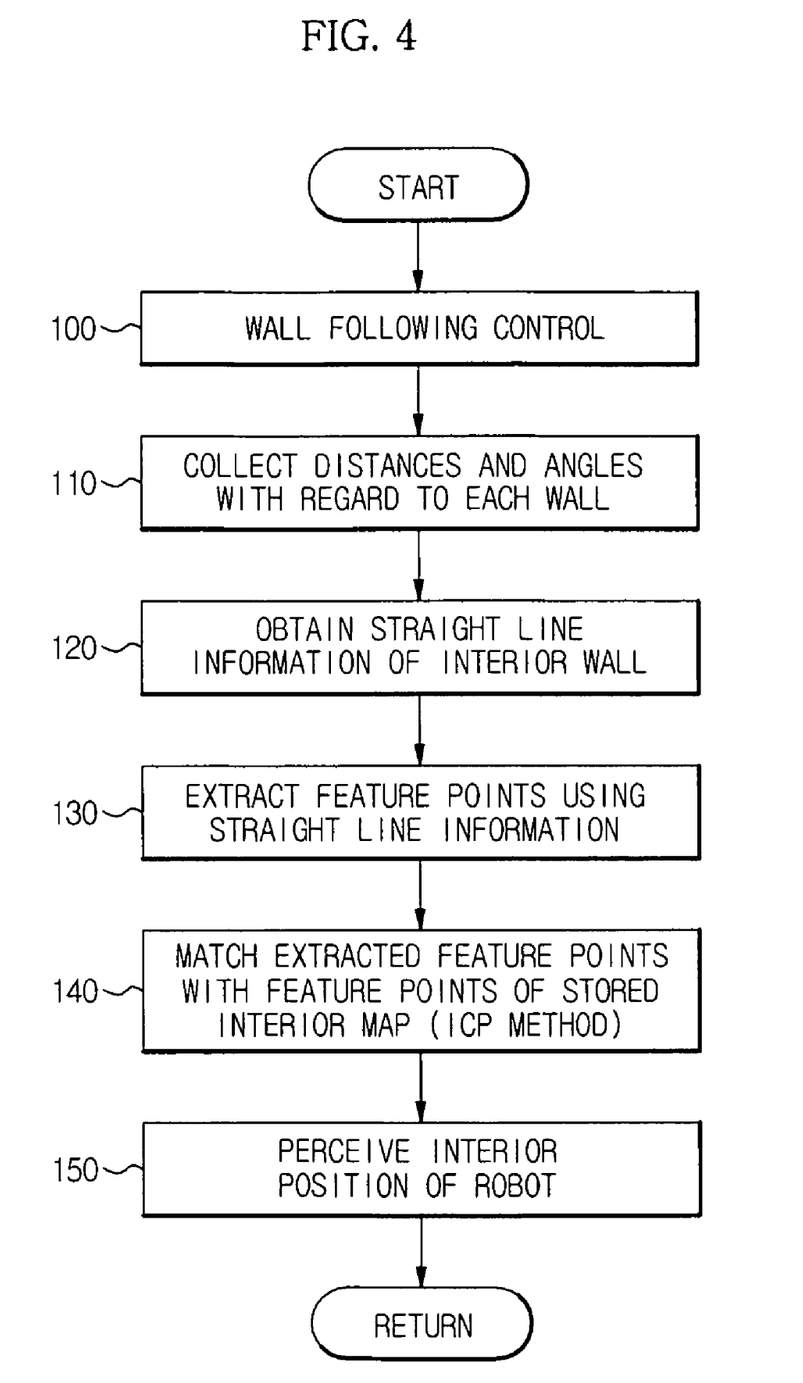
FIG. 4 is a control flowchart illustrating a locating method for the robot according to the embodiment of the present general inventive concept.

Referring to FIG. 4, the control unit 30 operates through processes of controlling the wall following operation of the robot (operation 100) that controls the robot to run following the interior wall, collecting distances and angles of the robot with respect to each interior wall during the controlling process (operation 110), obtaining the straight line information regarding the interior wall from the collected information on the distances and angles (operation 120), extracting the feature point using the obtained straight line information (operation 130), matching the extracted feature point to the feature point of the interior map (operation 140), and accordingly perceiving the interior position of the robot (operation 150).

In the controlling of the wall following operation (operation 100) illustrated in FIG. 4, a wall following algorithm functions to maintain a constant distance between the robot and the wall using the distance sensor. More particularly, the robot measures the distance to the wall using the side sensor 22 mounted to the lateral side thereof, and obtains inertia information using the encoder sensor 23 and the gyro sensor 24 mounted in the center thereof. Thus, the robot performs feedback control so as to maintain the constant distance.

Figure 5:
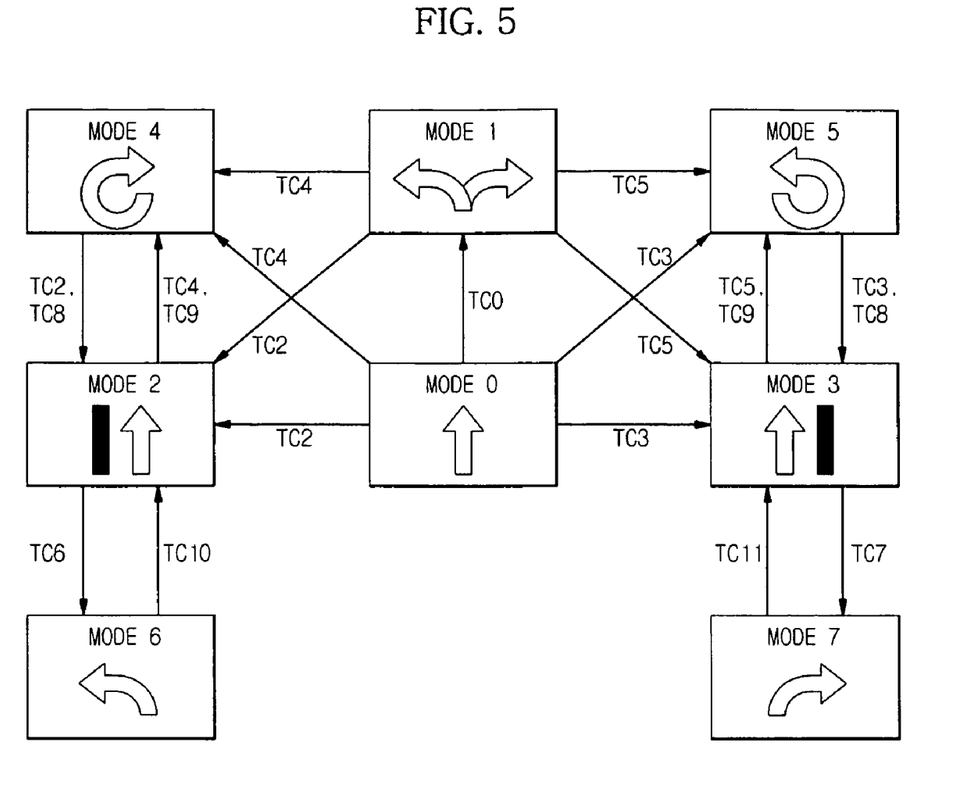
FIG. 5 is a view illustrating a mode converting processes during a wall following control of the present robot.
Figure 6:
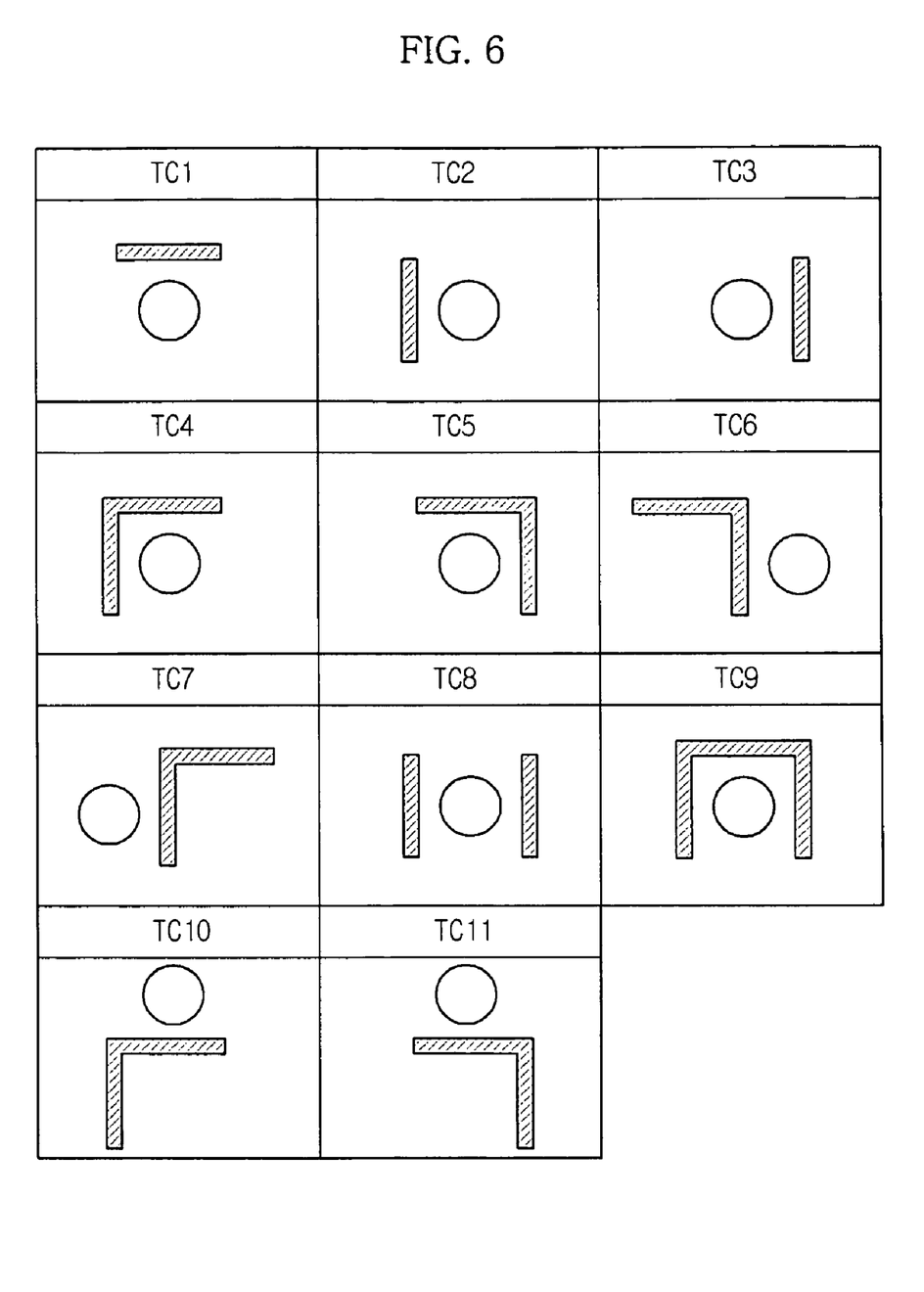
FIG. 6 is a view illustrating conditions of the mode conversion during the wall following control of the present robot.

A control event occurs depending on the shape of the wall. An algorithm in which the event occurs according to positional relations between the robot and the wall, thereby causing mode conversion is illustrated in FIG. 5. TC refers to trigger condition of the mode conversion. As illustrated in FIG. 6, the TC properly converts the mode according to the specific shapes of the walls.

In a mode 0, there is no wall and the robot runs in a linear motion. Since a wall may appear from any direction in mode 0, the mode can be converted to any other modes except modes 6 and 7 in which the robot turns an external corner of the wall. A mode 1 refers to a state where a wall appears in front. In this state, the robot turns to the left or the right by deciding on whether to follow the wall by the left or the right side thereof. Here, the mode is determined according to the turning direction. When the robot turns to the right, the mode is converted to a mode 4 or a mode 2 in which the wall remains on the left. When the robot turns to the left, the mode is converted to a mode 5 or a mode 3 in which the wall remains on the right.

The mode 2 and the mode 3 refer to the states where the wall appears on the left and the right, respectively. In those states, the robot follows the wall using the distance sensor mounted to the side thereof according to a certain algorithm. Since the low-cost distance sensor generates much noise and disturbance, Kalman filtering is performed additionally using information from the encoder sensor and the gyro sensor together with the distance sensor information so as to measure the distance and the angle between the robot and the wall more precisely. Next, a control gain is used in controlling the robot to run at a constant distance to the wall. When an L-shape cornered wall appears, the modes 2 and 3 may be converted to the modes 4 and 5, respectively. When the wall suddenly disappears, the modes 2 and 3 may be converted to the modes 6 and 7 wherein the robot turns an external corner of the wall.

The modes 6 and 7 refer to a state wherein the wall is cornered outwardly. In this state, although there seem to be no obstacles in any direction, the robot is turned by a predetermined angle to follow the wall until the wall is detected again on any side of the robot. Because the mode 0 also means absence of obstacles, the mode 6 or the mode 7 is maintained for a predetermined time from the state of following the existing wall, and then is converted to the mode 0 after the predetermined times passes.

Figure 7:
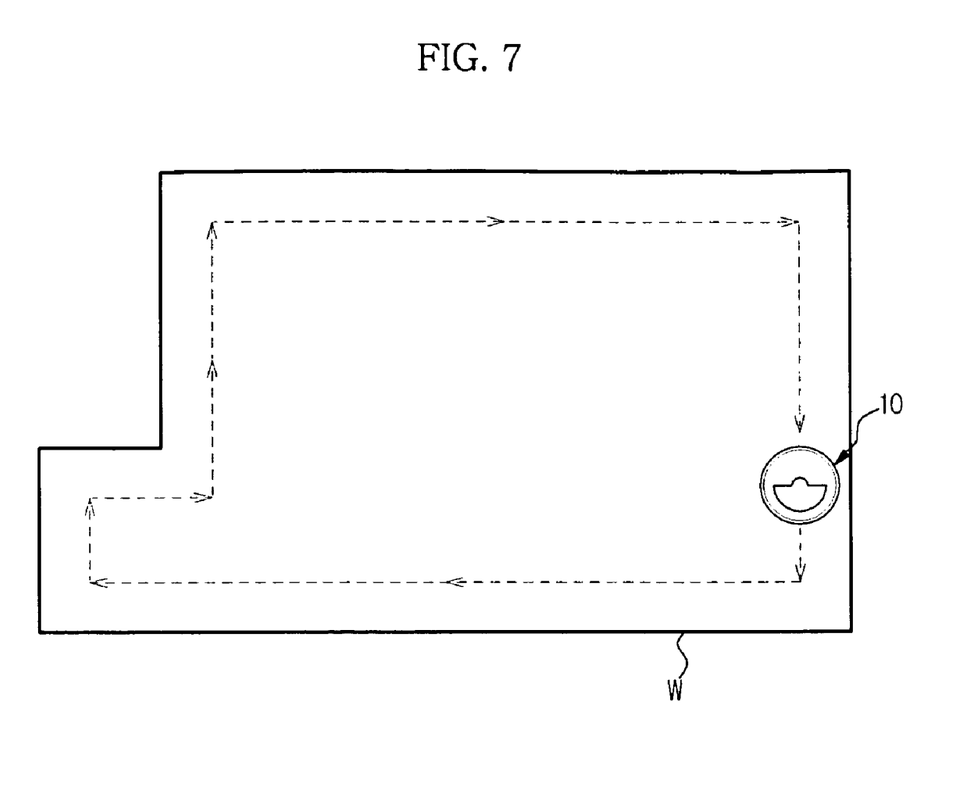
FIG. 7 is a view illustrating a state where the present robot follows the wall.

As illustrated in FIG. 7, according to the main algorithm of the wall following operation, the robot runs in parallel and constant distance to the wall. Since the distance sensor is generally subject to noise, a Kalman filter is used in extracting the distance information by additionally using the information of the encoder sensor and the gyro sensor. The Kalman filtering includes an estimation operation estimating the position by a model, and an update operation compensating for the estimated value through detected values by the sensors. The estimation operation estimates an output for the input using a model embodied through system identification. The update operation compensates the estimated position value using the detected values by the encoder sensor, the gyro sensor and the distance sensor.

More specifically, a discrete state space equation of the dynamics model of the robot, that is, the equation in discontinuous time and space can be expressed by [Equation 1] as follows:

$$x_{k+1} = A_k x_k + v_k$$

$$z_{k+1} = H_k x_k + w_k$$

$$Q_k = E[vv^T]$$

$$R_k = E[ww^T]$$

$$P_k = E[(x_k - \hat{x}_k)(x_k - \hat{x}_k)^T] \quad \text{[Equation 1]}$$

wherein, $x_k$ denotes a state variable, the estimated value of which is $\hat{x}_k$. $z_k$ denotes a measured value obtained through a sensor. $v_k$ denotes a Gaussian noise of the model, and $w_k$ denotes a Gaussian noise of the sensor.

When a model error and a sensor error exist, the Kalman filter generates an estimated value having the minimum possibility of error collectively through the information. The Kalman filter includes two operations, one of which is an estimation operation that estimates a value of the next operation using model information and an estimated value updating operation that updates the estimated value using the sensors.

The estimation step operation be expressed by [Equation 2] as follows.

$$\hat{x}_{k+1}^- = A_k \hat{x}_k$$

$$P_{k+1}^- = A_k P_k A_k^T + Q_k \quad \text{[Equation 2]}$$

As illustrated in [Equation 2] above, the estimation operation estimates the state of the next process through a model matrix of the estimated value obtained in the previous process. Here, P denotes a covariance value of an error between the estimated value and an actual value, which is apt to diffuse in the estimation operation.

The Kalman gain calculation is expressed by [Equation 3] below.

$$K_k = P_k^- H_k^T (H_k P_k^- H_k^T + R_k) \quad \text{[Equation 3]}$$

The estimated value updating operation is expressed by [Equation 4] below.

$$\hat{x}_k = \hat{x}_k^- + K_k(z_k - H_k x_k^-)$$

$$P_k = (I - K_k H_k) P_k^- \quad \text{[Equation 4]}$$

The estimated value of the estimation operation performs the updating using the sensor measured value. Through the Kalman gain, composition of the model estimated value and the sensor value can be achieved by the optimal ratio. In this case, the covariance value P is converged.

In the wall following mode, a Kalman filter algorithm is implemented through state variables as follows. The state variable $\hat{x}_k$ to be estimated can be expressed by an equation $\hat{x}_k = [x \ y \ v \ \theta]^T$, wherein an x-axis denotes the wall, a y-axis denotes the distance to the wall, v denotes the velocity and E denotes the angle formed by the advancing direction of the robot with the wall. The wall following control is performed using the estimated angle and distance. In this process, three sensors, that is, the encoder sensor, the gyro sensor and the distance sensor are used. Therefore, the estimated variable $z_k$ is expressed as $z_k = [dl_{left} \ dl_{right} \ d\theta \ d]^T$, each value of which respectively denotes an encoder left value, an encoder right value, an angle variation, and the distance to the wall. Here, the state variable may be set differently according to the position of wheels and a direction controlling method, but can be transformed into the above form by properly varying the above equations.

Additionally, the process of collecting information on the distance and the angle per wall (operation 110) will be described with reference to FIG. 4. First, the self locating of the robot is performed on the assumption that the information on the straight lines of the room is already obtained. That is, the robot is aware of the shape of the room but unaware of its position in the room. As the robot performs the mode 2 or the mode 3 of the wall following control, the distance from the robot to the wall and the angle forming parallelism with the wall, obtained through the Kalman filter, are converged to a certain value. When the covariance value with respect to the angle and the distance becomes less than a preset limit value, the distance information and the angle information are collected from that time point. An estimated initial covariance value and a sensor noise value are set in order to perform the Kalman filtering. The initial covariance is set at the moment when the mode is converted to mode 2 or 3. Here, accuracy of the estimated distance to the wall or the estimated angle with the wall is determined. The set value may be different according to the mode before being converted; for example, in case that mode 4 or 5 is converted to the wall following mode, the distance to the front wall may be set as the initial value. When relative distance and angle with respect to the wall are extracted as new state variables through the Kalman filtering, a control routine is carried out using the distance to the wall and the angle being estimated. According to the embodiment of the present general inventive concept, a control gain is obtained by applying a linear quadratic regulator (LQR).

Figure 8:
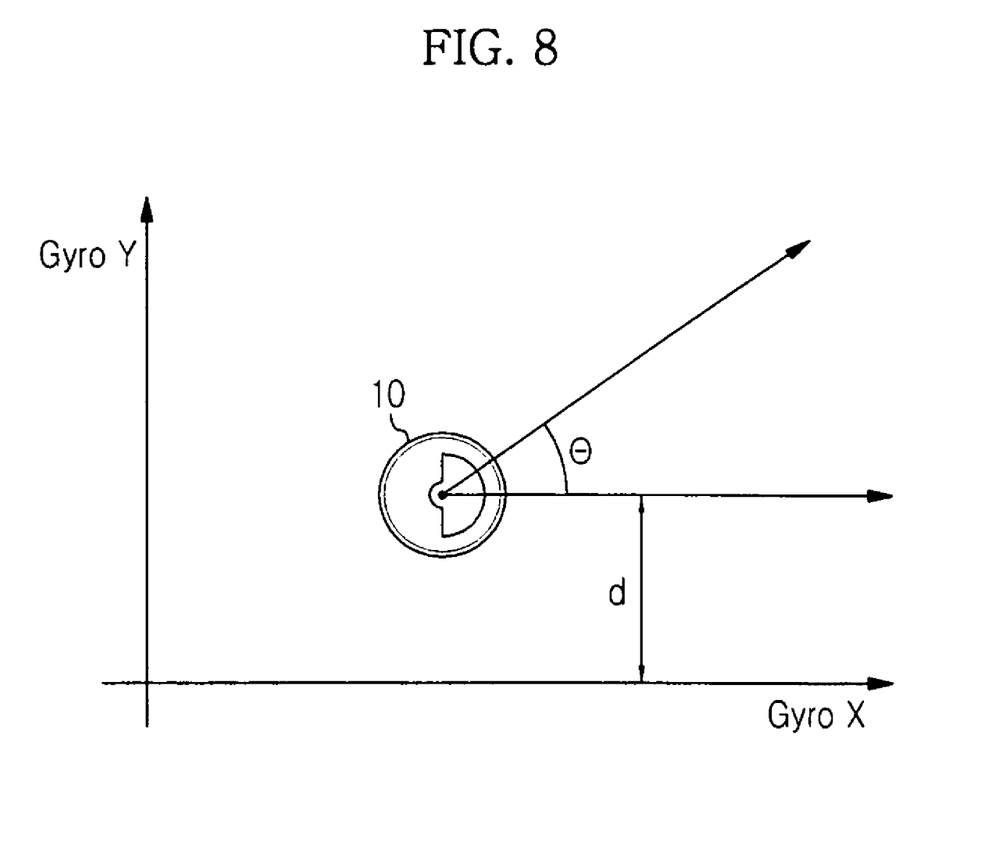
FIG. 8 is a view illustrating a concept of the wall following control of the present robot.

Next, with reference to FIG. 4, the process of obtaining the straight line information regarding the interior wall (operation 120) will now be explained. An equation for the straight line in an inertial coordinate system by measuring and recording the current position at the time of the measurement, the distance d and the angle θ together are illustrated in FIG. 8. By traveling once around the room continuously performing the wall following operation, the robot is able to collect several equations about the straight lines constituting the respective walls of the room.

Hereinafter, the process of extracting the respective feature points using the straight line information (operation 130) and the process of matching the feature points on the interior map (operation 140) will be explained.

Figure 9:
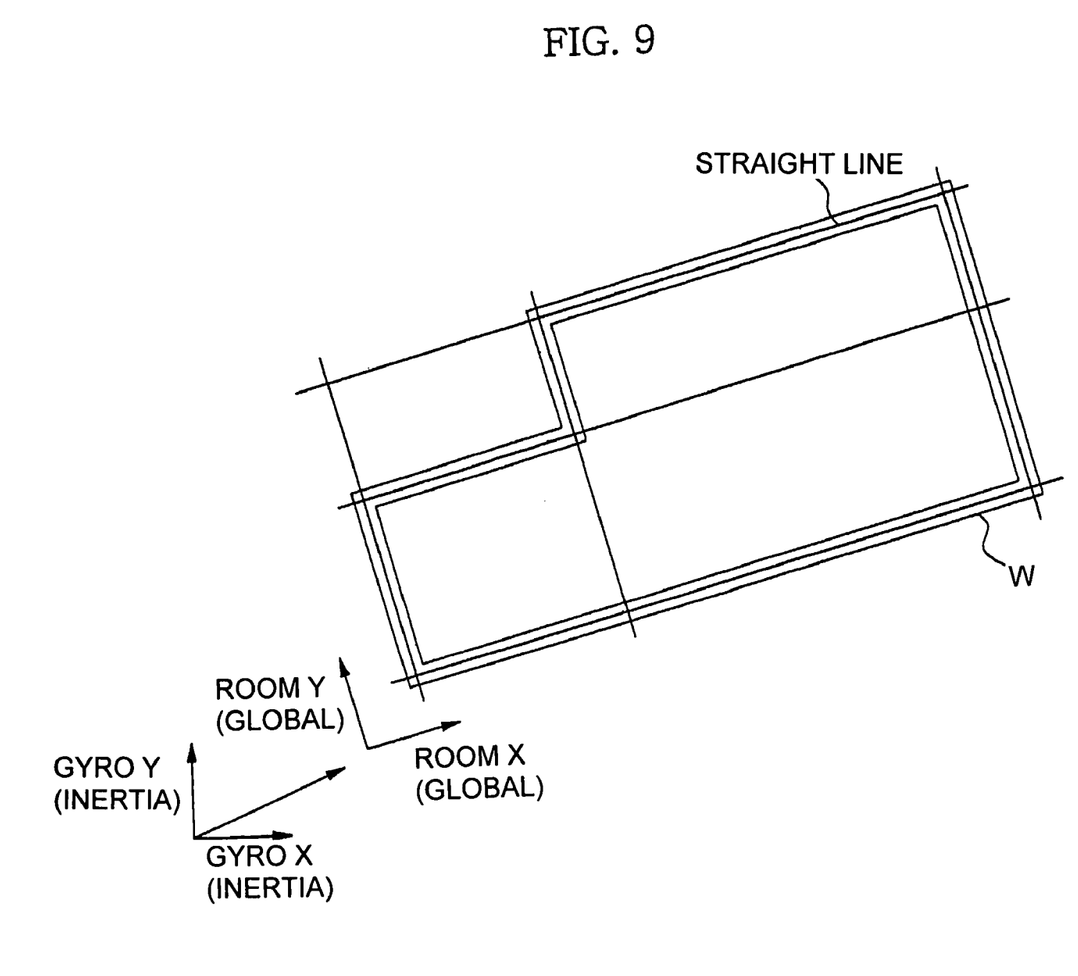
FIG. 9 is a view illustrating a straight line obtained as the present robot runs around a room one time.

FIG. 9 is a view illustrating a straight line obtained as the robot finishes traveling around the room once. Since the straight lines are expressed by equations on the basis of the inertial coordinate system, that is, a relative coordinate system comprising a Gyro-x axis and a Gyro-y axis, the precise positions of the straight lines on the basis of a global coordinate system based on the actual room, that is, an absolute coordinate system including a Room-x axis and a Room-y axis are not found. Accordingly, a transformation equation is required to correspond straight line components of the walls on a room-based coordinate system supplied as the interior map to straight line components obtained from the inertial coordinate system.

Figure 10:
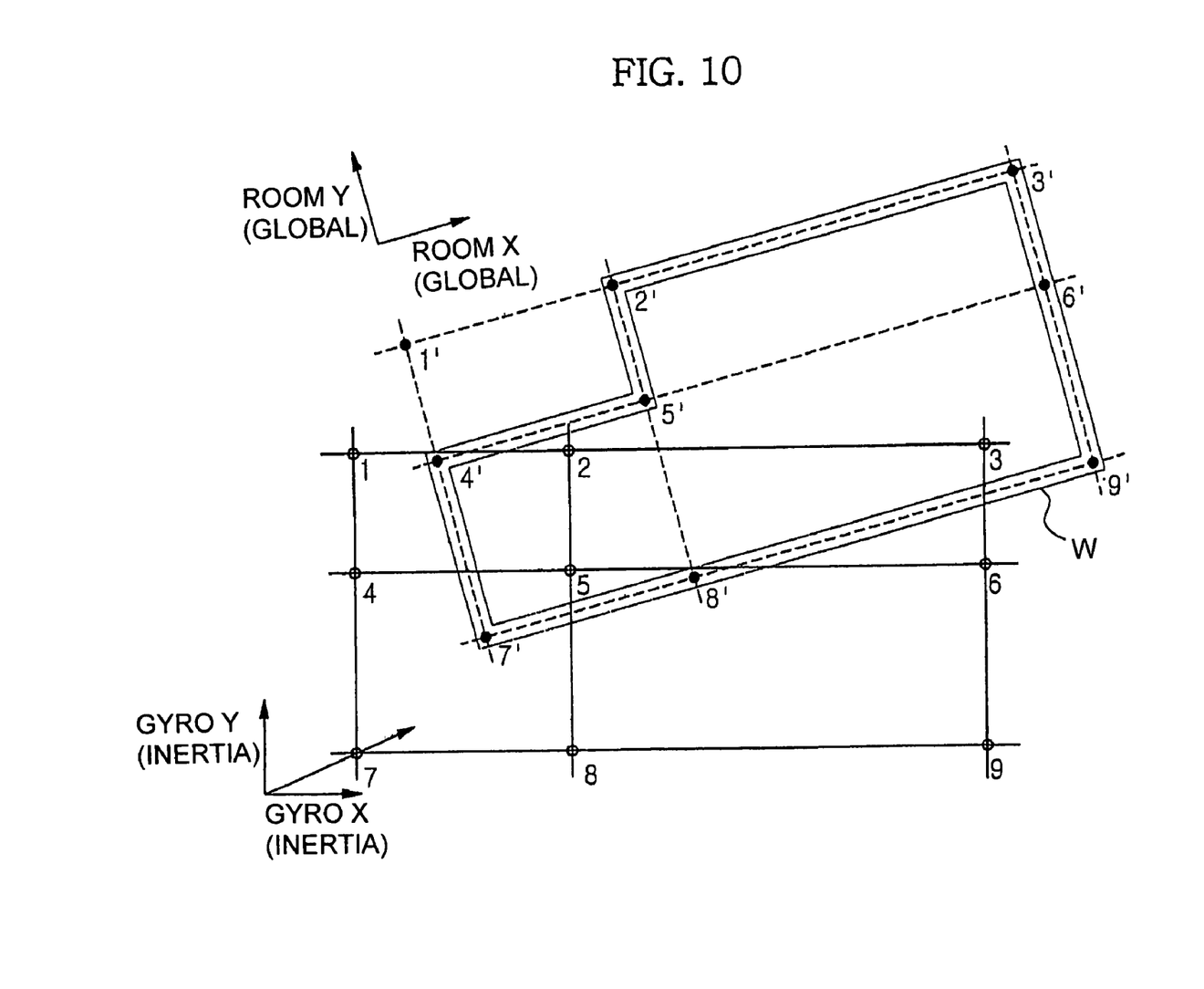
FIG. 10 is a view illustrating coordinate system matching through iterated closest point (ICP) correspondence in the present robot.

According to this embodiment, as illustrated in FIG. 10, intersection points of the straight lines of the interior walls in the interior map are prestored as feature points 1' to 9'. In addition, when the straight line information is obtained through the wall following operation, intersection points of every two straight lines are extracted respectively as feature points 1 to 9. The actual interior position of the robot can be perceived by rotating and translating the feature points and matching the prestored feature points 1' to 9' to the extracted feature points 1 to 9. Here, based on the global coordinate system obtained from the interior map, the straight lines having ideal equations are not supposed to meet if the lines are parallel with one another. According to the inertial coordinate system, however, parallel straight lines obtained through the wall following control might meet one another since a slight error of inclination may occur. Therefore, when an angle of intersection is less than a predetermined limit value, for example 10 degrees, the straight lines are assumed to be parallel, and accordingly the intersection points of those parallel straight lines are excluded from the feature points.

Iterated closest point (ICP) correspondence is used as a method to obtain respective correspondence points. The ICP is an algorithm to determine transform relations by matching each feature point to its nearest point and using a least squares method. More particularly, such an algorithm is performed as follows.

First, points located at the nearest position to each other are matched one to one.

Second, the rotation translation transformation value is obtained using the least squares method, to minimize the sum of square numbers of distances between the respective correspondence points. Assuming that T denotes the rotation translation transformation, $a_i$ denotes an i-th point component on the inertial coordinate system and $b_i$ denotes an i-th point component on the global coordinate system, the sum E of the transformed components of the global coordinate system and the distances between the respective correspondence points of the inertial coordinate system can be expressed by [Equation 5] below.

$$E = \sum_{i=1}^{n} |T(b_i) - a_i|^2 \quad \text{[Equation 5]}$$

Transformations $T_\theta$, $T_x$ and $T_y$ for minimizing the sum E can be expressed by [Equation 6] to [Equation 11] as follows.

$$T_\theta = \arctan \frac{\Lambda_{bxay} - \Lambda_{byax}}{\Lambda_{bxax} + \Lambda_{byay}} \quad \text{[Equation 6]}$$

$$T_x = \bar{a}_x - (\bar{b}_x \cos T_\theta - \bar{b}_y \sin T_\theta) \quad \text{[Equation 7]}$$

$$T_y = \bar{b}_y - (\bar{a}_x \sin T_\theta - \bar{a}_y \cos T_\theta) \quad \text{[Equation 8]}$$

$$\bar{a}_x = \frac{1}{n} \sum_{i=1}^{n} a_x^i, \quad \text{[Equation 9]}$$

$$\bar{a}_y = \frac{1}{n} \sum_{i=1}^{n} a_y^i,$$

$$\bar{b}_x = \frac{1}{n} \sum_{i=1}^{n} b_x^i,$$

$$\bar{b}_y = \frac{1}{n} \sum_{i=1}^{n} b_y^i$$

$$\Lambda_{bxax} = \sum_{i=1}^{n} (b_x^i - \bar{b}_x)(a_x^i - \bar{a}_x), \quad \text{[Equation 10]}$$

$$\Lambda_{byay} = \sum_{i=1}^{n} (b_y^i - \bar{b}_y)(a_y^i - \bar{a}_y)$$

$$\Lambda_{bxay} = \sum_{i=1}^{n} (b_x^i - \bar{b}_x)(a_y^i - \bar{a}_y), \quad \text{[Equation 11]}$$

$$\Lambda_{byax} = \sum_{i=1}^{n} (b_y^i - \bar{b}_y)(a_x^i - \bar{a}_x)$$

Third, the above first and second processes are repeated until the sum E does not substantially vary. Then, the algorithm is closed.

The ICP algorithm described above is proved to be able to finally converge the sum of the distances among all the points to a specific minimum value by reflexively repeating the matching and translation of the correspondence points. Therefore, by finding out an angle and a distance difference by which the correspondence points are overlapped most closely, the transformation which correctly matches a local coordinate system based on the inertial coordinate system to an ideal coordinate system of the room can be obtained. The interior position of the robot in the room can be found by transforming the robot position on the inertial coordinate system to that on the room-based coordinate system through the above obtained transformations.

The position on the inertial coordinate system relative to the position on the global coordinate system can be found by only extracting the values of the rotation translation transformations $T_\theta$, $T_x$ and $T_y$ through the ICP algorithm. The current position of the robot can be found through the following equations.

$$\theta_{gl} = \theta_{inertia} - T_\theta \quad \text{[Equation 12]}$$

$$\begin{bmatrix} x_{gl} \\ y_{gl} \end{bmatrix} = \begin{bmatrix} \cos\theta_{gl} & -\sin\theta_{gl} \\ \sin\theta_{gl} & \cos\theta_{gl} \end{bmatrix} \begin{bmatrix} x_{inertia} - T_x \\ y_{inertia} - T_y \end{bmatrix} \quad \text{[Equation 13]}$$

In the above equations, gl denotes a global coordinate variable and inertia denotes an inertial coordinate variable.

By thus obtaining the robot position and continuously detecting the distance between the robot and the wall, errors accumulated in the inertial navigation method can be compensated. Since the wall the robot is following can be located on the interior map, the posture and the location of the robot can be compensated through the angle formed by the robot and the distance to the wall, respectively.

Although embodiments of the present general inventive concept have been shown and described, it would be appreciated by those skilled in the art that changes may be made in this embodiment without departing from the principles and spirit of the general inventive concept, the scope of which is defined in the claims and their equivalents.

What is claimed is:

1. A method of locating a robot, comprising:
   obtaining information on absolute coordinates of a space where the robot will move;
   obtaining information on relative coordinates of the space comprising running the robot in the space;
   obtaining coordinate transformation information comprising comparing the information on absolute coordinates with the information on relative coordinates; and
   perceiving the robot position comprising transforming a position of the information relative coordinates to a position of the information absolute coordinates using the coordinate transformation information,
   wherein the obtaining of the information relative coordinates comprises detecting a distance and an angle of the robot with respect to a wall in accordance with the movement of the robot during a wall following operation of the robot, and obtaining the information on relative coordinates regarding the space comprising inputting the detected state quantity to a Kalman filter, and
   wherein the obtaining of the coordinate transformation information comprises matching the information on absolute coordinates with the information on relative coordinates comprising using rotation translation by iterated closest point (ICP) correspondence, and calculating the coordinate transformation information based on the matching the information on absolute coordinates.

2. The method of locating a robot of claim 1, wherein the obtaining information on relative coordinates comprises obtaining the information on relative coordinates after the obtaining the information on the absolute coordinates.

3. A method of locating a robot, comprising:
   operating the robot to run following a wall;
   detecting a distance and an angle of robot with respect to the wall;
   obtaining straight line information on straight lines defining the wall based on the detected distance and angle during the operation the robot to run following the wall;
   matching the obtained straight line information with straight line information of a presorted map; and
   estimating an interior position of the robot based on the matching.

4. The method of locating a robot of claim 3, wherein the obtaining of the straight line information comprises:

detecting the distance and the angle varying in accordance with the movement of the robot during the operating the robot to run following the wall; and obtaining the straight line information of the wall the robot is following, comprising inputting the detected state quantity to a Kalman filter.

5. The method of locating a robot of claim 4, wherein the obtaining of the straight line information comprises:

collecting the distances and the angles between the robot and the wall when a covariance error of the Kalman filter is less than a preset value; and obtaining the straight line information of the wall the robot is following based on the collected distances and angles.

6. The method of locating a robot of claim 3, wherein the matching comprises:

obtaining intersection points of the straight lines on relative coordinates using the obtained straight line information; and matching the obtained intersection points with intersection points of the straight lines on absolute coordinates according to the straight line information of the pre-stored map through rotation translation by iterated closest point (ICP) correspondence.

7. The method of locating a robot of claim 6, wherein the obtaining of the intersection points comprises obtaining coordinate transformation information for transformation of a position of the robot on the relative coordinates to a position of the robot on the absolute coordinates.

8. The method of locating a robot of claim 3, wherein the matching comprises obtaining the coordinate transformation information for transforming the position on the relative coordinates to the position on the absolute coordinates.

9. The method of locating a robot of claim 8, wherein the estimating comprises transforming the position on the relative coordinates to the position on the absolute coordinates using the obtained coordinate transformation information.

10. A method of locating a robot, comprising:

operating the robot to run following a wall;

determining a distance and an angle of the robot with respect to the wall during the operating the robot to follow the wall;

obtaining straight line information on straight lines defining the wall based on the determined distance and angle;

extracting feature points from the obtained straight line information;

matching the extracted feature points with feature points on a presorted map; and estimating an interior position of the robot based on the matching.

11. The robot locating method of claim 10, wherein the obtaining of the straight line information comprises:

collecting distances and angles between the robot and the wall when the detected distance and angle are input to a Kalman filter and a covariance error of the Kalman filter is less than a preset value; and obtaining the straight line information based on the collected distances and angles.

12. The robot locating method of claim 10, wherein the extracting the feature points comprises extracting intersection points of the straight lines, an angle between the straight lines being greater than a preset angle, as the feature points using the obtained straight line information.

13. The robot locating method of claim 10, wherein the matching with the feature points comprises matching the extracted feature points with feature points on a prestored map through rotation translation by ICP correspondence.

14. The robot locating method of claim 10, wherein the estimating of the interior position comprises:

obtaining coordinate transformation information for transforming an absolute coordinate position of the robot to a relative coordinate position based on the matching; and estimating the interior position of the robot comprising transforming the relative coordinate position to the absolute coordinate position comprising using the obtained coordinate transformation information.

15. An apparatus to locate a robot, comprising:

a storage unit storing straight line information on straight lines defining a wall on a map;

a state quantity detection unit detecting a distance and an angle of the robot from the wall of the robot running along the wall; and a control unit estimating an interior position of the robot by obtaining straight line information based on the detected distance and angle and matching the obtained straight line information with the stored straight line information.

16. The apparatus to locate a robot of claim 15, wherein the state quantity detection unit comprises an encoder sensor detecting a running velocity of the robot, a gyro sensor detecting a rotational velocity of the robot, and a distance sensor detecting the distance to the wall.

17. The apparatus to locate a robot of claim 15, wherein the control unit obtains the straight line information of the wall the robot is following, by inputting the detected distance and angle to a Kalman filter.

18. The apparatus to locate a robot of claim 17, wherein the control unit collects distances and angles between the robot and the wall when a covariance error of the Kalman filter is less than a preset value, and obtains the straight line information of the wall the robot is following based on the collected distances and angles.

19. The apparatus to locate a robot of claim 15, wherein the storage unit, storing intersection points of the straight lines defining the wall on absolute coordinates, obtains intersection points on relative coordinates through the obtained straight line information and matching the obtained intersection points with the stored intersection points by rotation translation through ICP correspondence.

20. The apparatus to locate a robot of claim 19, wherein the control unit obtains the intersection points of straight lines, an angle between which is greater than a preset angle, based on the obtained straight line information.

21. The apparatus to locate a robot of claim 15, wherein the control unit obtains coordinate translation information to transform a position of the robot on absolute coordinates to a position of the robot on relative coordinates through the matching.

22. The apparatus to locate a robot of claim 15, wherein the control unit estimates the interior position of the robot by transforming a position of the robot on relative coordinates to a position of the robot on absolute coordinates using coordinate transformation information.

23. An apparatus to locate a robot, comprising:

a state quantity detection unit detecting a distance and an angle of the robot from a wall running along the wall; and a control unit estimating an interior position of the robot by obtaining straight line information by inputting the detected distance and angle to a Kalman filter and matching feature points extracted from the obtained straight line information with feature points on a pre-stored map by iterated control point (ICP) correspondence.

* * * * *